United States Patent

Hashimoto

Patent Number: 5,443,219
Date of Patent: Aug. 22, 1995

[54] REVERSAL PREVENTIVE DEVICE FOR FISHING REEL

[75] Inventor: Hiroshi Hashimoto, Tokyo, Japan

[73] Assignee: Daiwa Seiko, Inc., Tokyo, Japan

[21] Appl. No.: 274,559

[22] Filed: Jul. 13, 1994

[30] Foreign Application Priority Data

Jul. 14, 1993 [JP] Japan .................. 5-195559

[51] Int. Cl.⁶ .................................. A01K 89/027
[52] U.S. Cl. ........................ 242/300; 188/82.3; 188/82.4; 242/247
[58] Field of Search ............. 242/247, 248, 298, 299, 242/300; 188/82.3, 82.34, 82.4

[56] References Cited

U.S. PATENT DOCUMENTS

| 4,340,189 | 7/1982 | Volkert et al. | 188/82.3 X |
| 4,408,728 | 10/1983 | Pittman | 188/82.3 X |
| 4,546,932 | 10/1985 | Ohmori | 242/300 |
| 4,614,314 | 9/1986 | Ban | 242/248 |
| 4,650,134 | 3/1987 | Councilman | 242/248 |
| 4,919,361 | 4/1990 | Kobayashi | 242/247 X |
| 5,042,741 | 8/1991 | Aota | 242/248 X |
| 5,318,243 | 6/1994 | Hitomi et al. | 242/247 X |

FOREIGN PATENT DOCUMENTS 58-20126  4/1983  Japan .

Primary Examiner—Joseph J. Hail, III
Attorney, Agent, or Firm—Longacre & White

[57] ABSTRACT

The invention concerns a reversal preventive device for a fishing reel. An annular operation member is rotatably fitted on a rotary shaft, such as a handle shaft rotatable in linking with the rotation of a handle. A friction member is provided in an inner circumference of the operation member and depressed radially inwardly onto an outer circumference of the handle shaft with the aid of a coiled spring. An engagement portion and an operation jut driven by the engagement portion are provided on the operation member and a reversal preventive claw, respectively, so as to control the engagement of the reversal preventive claw with a reversal preventive rachet wheel in conjunction with the rotation of the handle shaft.

10 Claims, 5 Drawing Sheets

REVERSAL PREVENTIVE DEVICE FOR FISHING REEL

BACKGROUND OF THE INVENTION

The present invention relates to a reversal preventive device for a fishing reel.

As an example of a reversal preventive device for a fishing reel, Japanese Utility Model Examined Publication No. Sho. 58-20126 discloses a device wherein a reversal preventive claw is provided to be engaged with and disengaged from a reversal preventive rachet wheel provided on a rotary quill of a rotor in a fishing reel. In the disclosed device, a spring is wound on an outer periphery of the rotary quill, and one end of the wound spring is engaged with the reversal preventive claw so that the reversal preventive claw is disengaged from or engaged with the rachet wheel in conjunction with the forward or reverse rotation of a handle.

The engage/disengage system in the device utilizing the wound spring, however has the following problems:

Since it is difficult to manufacture from wiring material a wound spring having a uniform and constant configuration and further the manufactured wound spring is likely to be deformed when handling it, the force of the spring, which is wound on the rotary shaft portion, is unstable so as to hinder the proper, stable reversal preventive function. Since the spring is fittingly mounted on the rotary shaft to provide a friction between the rotary shaft and the spring, it is likely to wear. Further, springs to be incorporated in the fishing reel are likely to be tangled with each other, to hinder the rapid and smooth assembling of the fishing reel.

SUMMARY OF THE INVENTION

The present invention was made in order to solve the problems found in the prior art. Accordingly, a primary objective of the invention is to provide a reversal preventive device for a fishing reel, enabling a stable and constant reverse rotation preventive performance which was not accomplished by the prior art arrangements due to the non-uniformity of force produced by the wound spring used.

In order to attain the above-noted and other objectives, the present invention provides a reversal preventive device for a fishing reel, in which a pivotable reversal preventive claw is brought into engagement with a reversal preventive rachet wheel to prevent a rotation of a rotary shaft. The device includes: an operation member loosely and rotatably mounted on the rotary shaft; a friction member contactable with a portion of the rotary shaft and coupled with the operation member; means (preferably, a spring) for biasing the friction member onto the portion of the rotary member to cause a friction; and an engagement member provided on the operation member for operating the reversal preventive claw when the operation member is rotated thorough the friction in linking with a rotation of the rotary shaft.

DETAILED DESCRIPTION OF THE PREFERRED EMBODIMENTS

Preferred embodiments of the present invention will now be described with reference to the drawings attached hereto.

Figure 1:
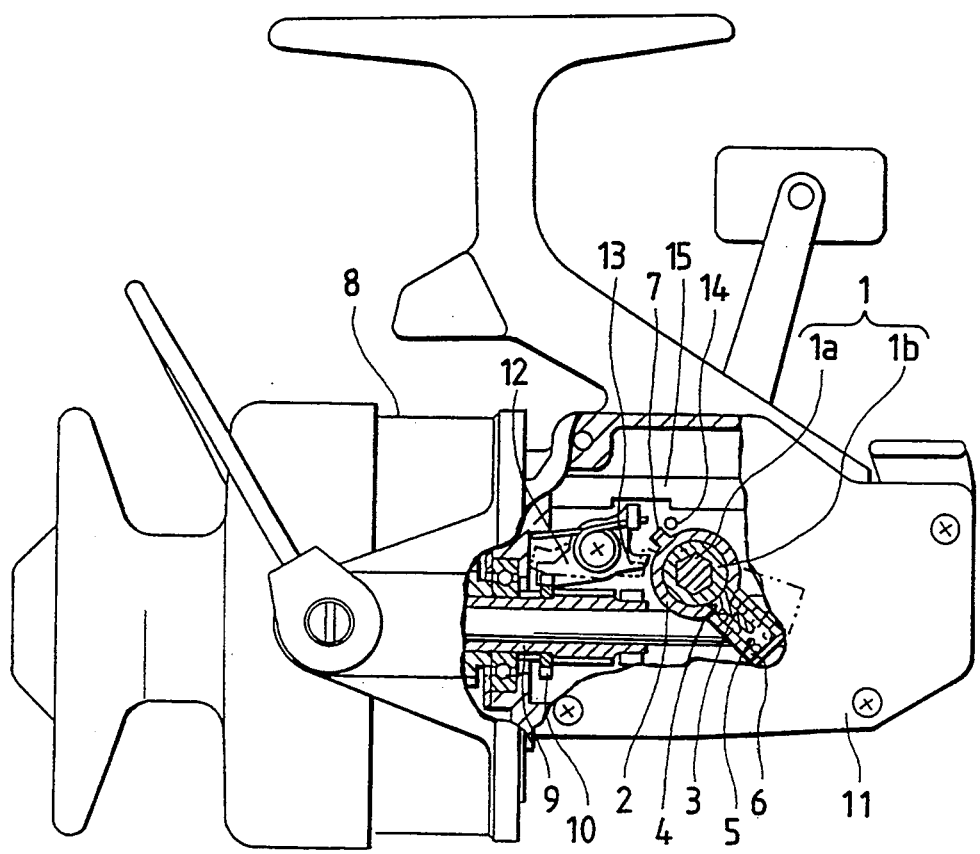
FIG. 1 is a partially sectional front view showing a first embodiment of the present invention.
Figure 2:
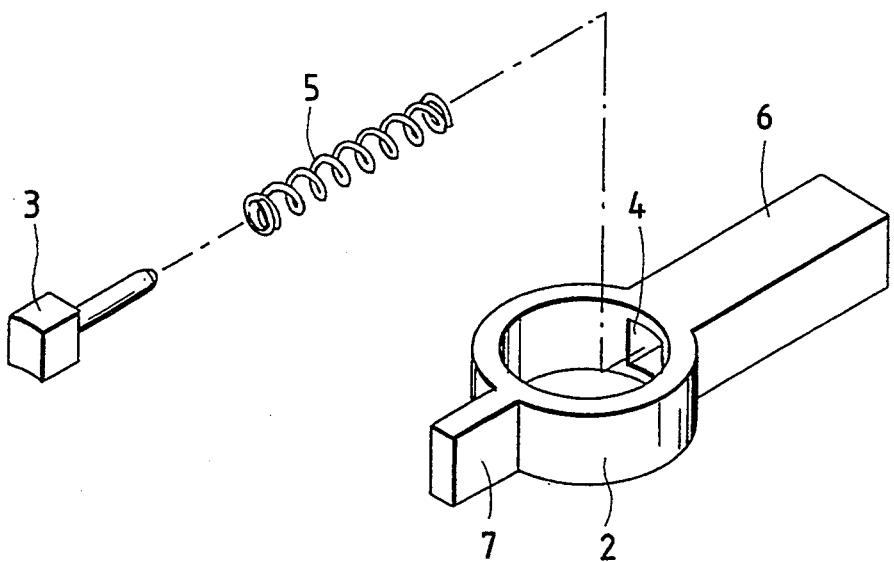
FIG. 2 is an exploded perspective view of major parts of the first embodiment.

FIGS. 1 and 2 show a first embodiment of the present invention. In the first embodiment, an annular operation member 2 is rotatably fitted on a hollow drive shaft 1a which is non-rotatably fitted on a handle shaft 1b of a spinning reel. In this embodiment, the drive shaft 1a and the handle shaft 1b constitute a rotary shaft 1 which is rotatable in linking with the handle rotation. The annular operation member 2 is formed with a first accommodation portion 4 opened at an inner circumference of the annular operation member 2, and a second accommodation portion 6 merging with the first accommodation portion 4. The first accommodation portion 4 is provided for accommodating therein a friction member 3 made from synthetic resin or other materials. The second accommodation portion 6 is provided for accommodating therein a depression or biasing means, such as a spring 5, which is for biasing or depressing the friction member 3 onto an outer periphery of the rotary shaft 1. The coiled spring 5 producing an elastic restoring force is used as the biasing means in this embodiment, but an elastic rubber producing a similar elastic restoring force or a magnet producing a repulsive force may be used as the biasing means of the present invention. An engagement portion 7 is projectingly provided on the operation member 2 at diametrically opposite location from the second accommodation portion 6.

A reversal preventive rachet wheel 10 is fixedly secured to a rotary quill 9 which is rotated in linking with the rotation of the handle shaft 1 and to which a rotor 8 is secured. A reversal preventive claw 12, which is normally biased in a direction to engage with the rachet wheel 10, is pivotably supported on a reel casing 11. The reversal preventive claw 12 is formed with an operation jut 13 engageable with the engagement portion 7 of the operation member 2, so that the engagement between the claw 12 and the rachet wheel 10 can be controlled by the operation member 2. In addition, reference numeral 14 designates a rotation restricting stopper for the annular operation member 2; and 15, a switching cam for the reversal preventive claw 15.

The operation of the reversal preventive device thus constructed will be described:

When the handle shaft 1b is rotated in a counterclockwise direction, i.e. a fishline winding direction, under a condition that the switching cam 15 is switched to permit the reversal preventive claw 12 to be engaged with the reversal preventive rachet wheel 10, the annular operation member 2 is rotated in conjunction with the rotation of the handle shaft 1 through the friction between the friction member 3 and the drive shaft 1b, so that the engagement portion 7 is engaged with the operation jut 13 of the reversal preventive claw 12 to disengage the reversal preventive claw 12 from the reversal preventive rachet wheel 10. As the rotation of the handle shaft 1 in the fishline winding direction continues, the annular operation member 2 is slid on the drive shaft 1b while keeping a condition that the engagement portion 7 disengages the reversal preventive claw 12 from the reversal preventive rachet wheel 10 through the operation jut 13. When the rotor 8 attempts to rotate in a clockwise direction, i.e. a fishline unwinding direction, the annular operation member 2 is put out of that condition so that the attempt reverse rotation of the rotor is inhibited by the engagement between the reversal preventive claw 12 and the reversal preventive rachet wheel 8.

If the switching cam 15 is switched to keep a condition that the reversal preventive claw 12 is disengaged from the reversal preventive rachet wheel 10, the rotor 8 is permitted to rotate in both forward and reverse directions.

Figure 3:
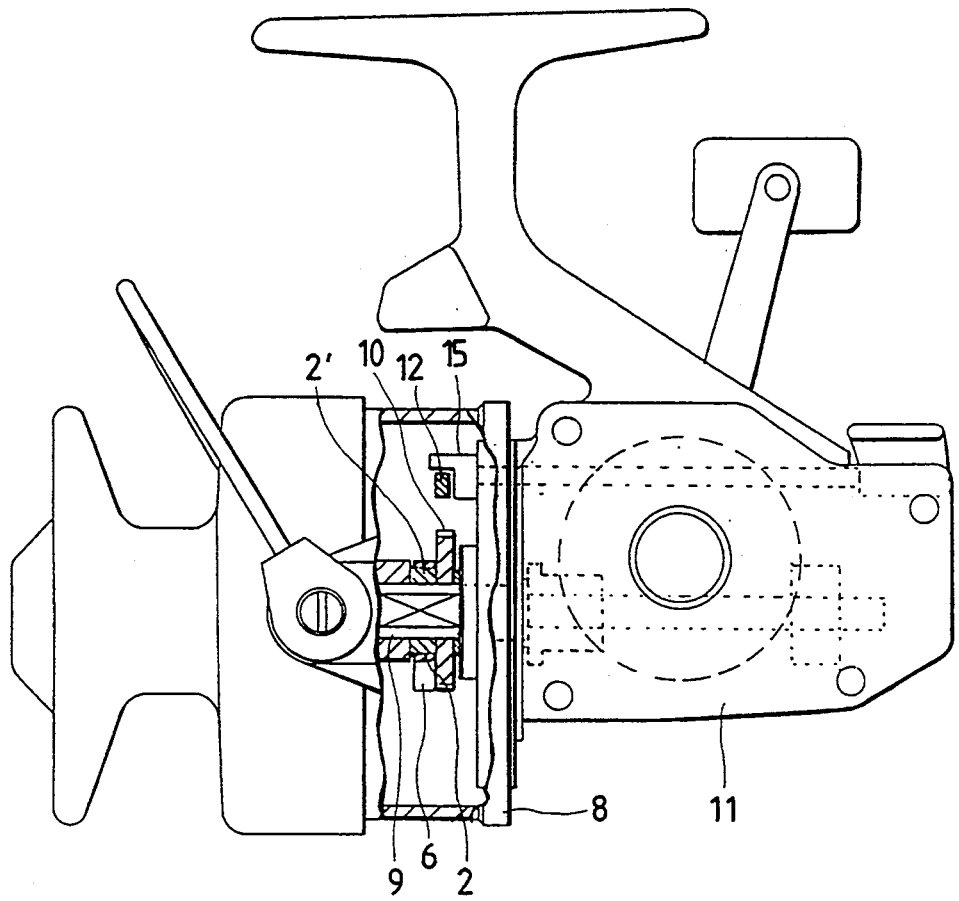
FIG. 3 is a partially sectional front view of a second embodiment of the present invention.
Figure 4:
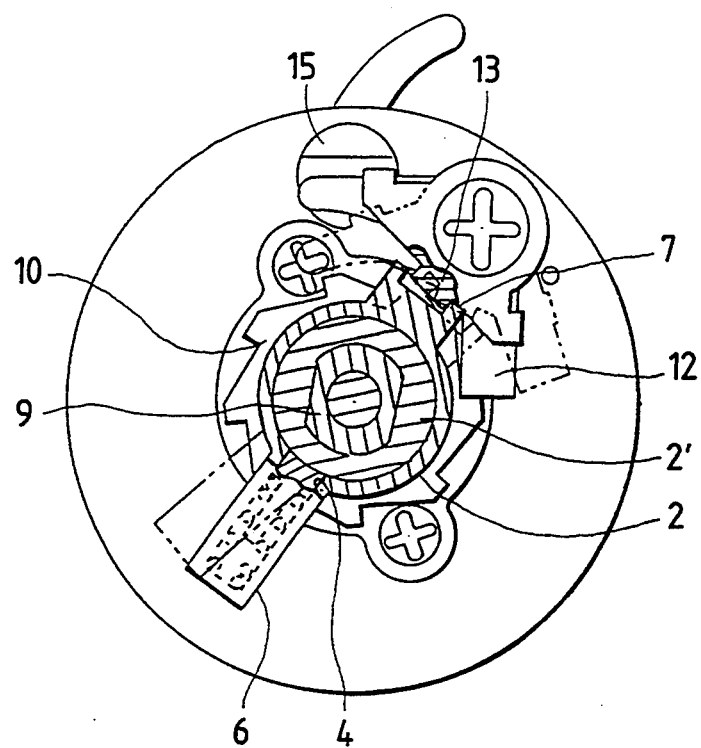
FIG. 4 is a longitudinally sectional side view of the second embodiment.

FIGS. 3 and 4 show a second embodiment of the present invention, which includes a collar 2' through which an annular operation member 2 is rotatably fitted on a rotary quill 9 to which a reversal preventive rachet wheel 10 is secured. In this embodiment, the collar 2' and the rotary quill 9 non-rotatably coupled together constitute the rotary shaft of the present invention, which is rotatable in linking with the handle rotation. An engagement portion 7 with a recess is formed in the annular operation member 2, and an operation jut 13 which projects inwardly from an axially supported portion of the reversal preventive claw 12 is brought into engagement with the recess of the engagement portion 7. As similarly to the first embodiment, when the rotary quill 9 of the rotor is rotated in a fishline winding direction, the annular operation member 2 is slid relative to the rotary quill 9, keeping a condition that the engagement portion 7 of the annular operation member 2 disengage the reversal preventive claw 12 from the reversal preventive rachet wheel 10, and on the other hand, when the rotary quill 9 attempts to be rotated in the fishline unwinding direction, the engagement portion 13 of the annular operation member 2 is driven so as to engage the reversal preventive claw 12 with the reversal preventive rachet wheel 10, to thereby inhibit the attempt reverse rotation.

Figure 5:
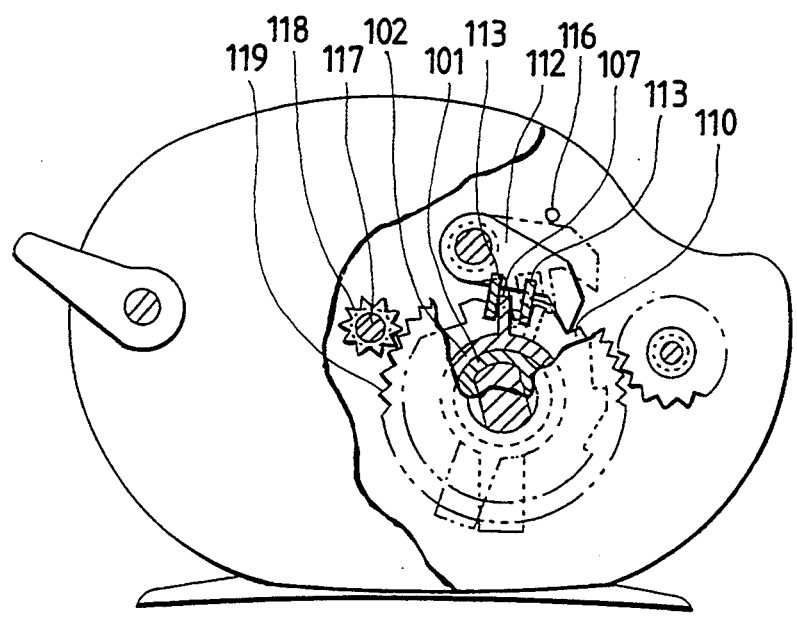
FIG. 5 is a partially sectional front view of a third embodiment of the present invention.

FIG. 5 shows a third embodiment of the present invention, in which an annular operation member 102 and a reversal preventive rachet wheel 110 are mounted on a handle shaft 101 of a double bearing type fishing reel in such a manner that an engagement portion 107 of the annular operation member 102 is engaged between a pair of operation juts 113 of the reversal preventive claw 112. The annular operation member 102 is rotatable relative to the handle shaft 101, and the reversal preventive rachet wheel 110 is secured to the handle shaft 101 so as to rotate together with the handle shaft 101. As similarly to the first and second embodiments, the annular operation member 102 disengage the reversal preventive claw 112 from the reversal preventive rachet wheel 110 at the time of the rotation of the handle shaft 101 in the fishline winding direction. When the handle shaft 101 attempts to rotate reversely, the engagement portion 107 of the annular operation member 102 is operated to engage the reversal preventive claw 112 with the reversal preventive rachet wheel 110, to thereby inhibit the reverse rotation. In addition, reference numeral 116 designates a stopper for the reversal preventive claw 112; 117, a spool shaft; 118, a pinion; and 119, a drive gear provided on the handle shaft 101 and meshed with the pinion 118. As noted previously in connection with the first embodiment, an elastic rubber or magnets may be used as the depression or biasing means 5 for the friction member 3 in place of a spring used in this embodiment.

In each of the reversal preventive devices according to the first to third embodiments of the present invention, an annular operation member is rotatably fitted on a rotary shaft which is rotatable in linking with rotation of a handle, a friction member is provided in an inner circumference of the annular operation member and depressed radially inwardly onto an outer circumference of the rotary shaft, and an engagement portion is provided on the operation member for operating a reversal preventive claw to engage with and disengage from a reversal preventive rachet wheel.

In case where the present invention is applied to a spinning type fishing reel as in the first and second embodiments, a handle shaft or a rotary quill of a rotor can be used as the rotary shaft to which the annular operation member is fitted, where the reversal preventive rachet wheel may be provided on handle shaft or the rotary quill. In the first embodiment, the annular operation member is mounted on the handle shaft through a hollow drive shaft which is non-rotatably fitted on the handle shaft, but it is also possible that the annular operation member is directly fitted on the handle shaft when the handle shaft is formed to define a circular outer surface. Similarly, the annular operation member may be directly fitted on the rotary quill. In case where the present invention is applied to a double bearing type fishing reel as in the third embodiment, a handle shaft is preferably used as the rotary shaft so that both the annular operation member and the reversal preventive rachet wheel are fitted onto the handle shaft. As to a depression or biasing means for depressing the friction member onto the outer circumference of the rotary shaft, a coiled spring, an elastic rubber, magnet or the like can be utilized.

The annular operation member rotatably fitted onto the rotary shaft follows the forward and reverse rotations of the rotary shaft since the friction member depressingly contacts the rotary shaft and causes the friction therebetween. As a consequence of the following rotations of the annular operation member, the engagement portion thereof operates the reversal preventive claw to be engaged with or disengaged from the reversal preventive rachet wheel.

Figure 6:
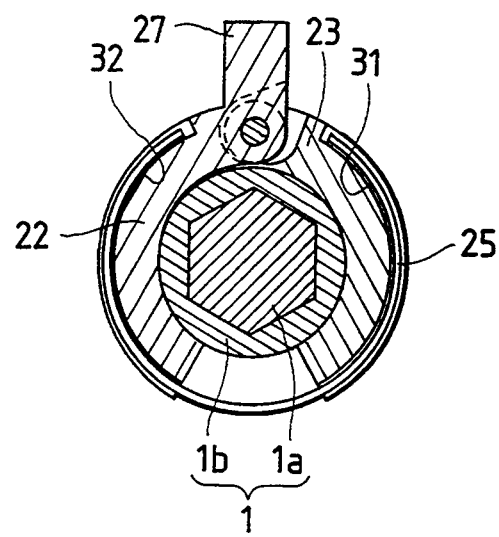
FIG. 6 is a longitudinally sectional view showing major parts of a fourth embodiment of the invention.
Figure 7:
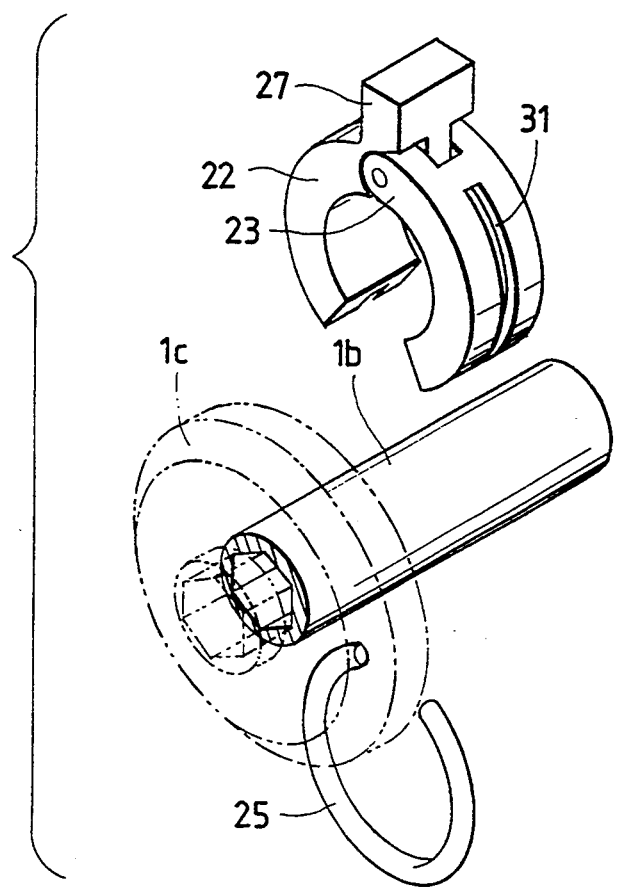
FIG. 7 is an exploded perspective view showing the major parts of the fourth embodiment.

FIGS. 6 and 7 show a fourth embodiment of the present invention. In the fourth embodiment, an arcuate friction member 23 is pivotably coupled to a portion of an arcuate operation member 23 where an engagement member 27 projects radially outwardly. The friction member 23 and the operation member 22 are respectively formed with annular grooves 31 and 32 which receive a spring 25. The spring 25 received in the annular grooves 31 and 32 biases the friction member 23 onto the outer periphery of the drive shaft 1b, causing a friction by which the operation member 22 is rotatable in linking with the rotation of the drive shaft 1b. The friction member 23 and the spring 25, in this embodiment, also function to mount the operation member 22 on the drive shaft 1b. Since the spring 25 is not in contact with the drive shaft 1*b* and a biasing force of the spring 25 is not directly applied onto the drive shaft 1*b*, a constant friction can be obtained as similarly to the former embodiments, the intended linking of the operation member 22 together with the rotary shaft 1 in both forward and reverse rotations can be surely and stably achieved. Further, the spring 25 is simple in structure, which contributes to remove the production inaccuracy. That is to say, a spring 25 providing a constant biasing force can be easily manufactured.

Figure 8:
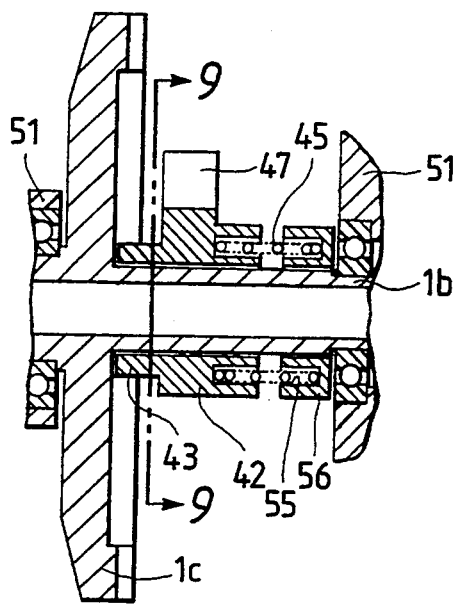
FIG. 8 is a sectional view of major parts of a fifth embodiment.
Figure 9:
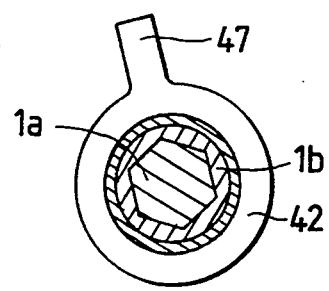
FIG. 9 is a sectional view taken along line 9—9 of FIG. 8.
Figure 10:
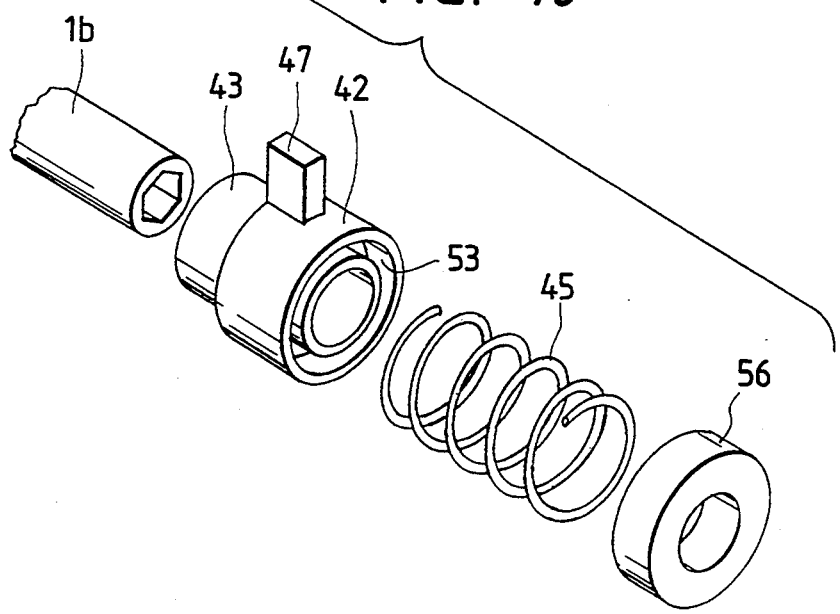
FIG. 10 is an exploded perspective view of the major parts of the fifth embodiment.

FIGS. 8, 9 and 10 show a fifth embodiment of the present invention. In the fifth embodiment, an annular friction member 43 is coaxially and integrally formed on an annular operation member 42 having an engagement portion 47. The friction member 43 and the operation member 42 are loosely and rotatably mounted on the drive shaft 1*b*. The operation member 42 is formed with an annular recess 53 located opposite from the friction member 43 in an axial direction thereof. The annular recess 53 receives one end of a coiled spring 45. The other end of the coiled spring 45 is received by an annular recess 55 formed in an annular spring seat 56 which is rotatably mounted on the drive shaft 1*b*. The spring 45, which is held between the operation member 42 and the spring seat 56 and non-contacted with the drive shaft 1*b*, functions to longitudinally (axially) bias the friction member 43 onto a portion of the drive gear 1*c* integrally provided on the drive shaft 1*b*. That is to say, the friction between the friction member 43 and the drive gear 1*c*, which is caused owing to the axial biasing force of the spring 45, enables the desired linking rotation of the operation member 42 in liking with the rotation of the drive shaft 1*b*. In addition, reference numeral 51 designates a reel casing. In this embodiment, the drive shaft 1*b* and the drive gear 1*c* constitute the rotary shaft of the present invention, which is rotatable in linking with the handle rotation.

In the present invention, in order to drive a reversal preventive claw to be disengaged from a reversal preventive rachet wheel in conjunction with rotation of a rotary shaft in the forward, fishline winding direction, an operation member is frictionally coupled to the rotary shaft portion with the aid of a friction member and a biasing means. Since the direction of force produced by the biasing means to conduct the reversal preventive function is not unnatural, it is possible to provide a reversal preventive device, which has a constant quality, and is durable for a long time use. Further, the biasing means of the present invention is kept in non-contact with the rotary shaft, that is, the friction between the biasing means and the rotary shaft is not utilized. This arrangement also contributes to provide a reversal preventive device, which has a constant quality, and is durable for a long time use. Further, it is unnecessary to wind a wiring material onto the rotary shaft, the reversal preventive device can be assembled into a fishing reel with rapid and easy work.

What is claimed is:

1. A reversal preventive device for a fishing reel, in which a pivotable reversal preventive claw is brought into engagement with a reversal preventive rachet wheel to prevent a rotation of a rotary shaft, said device comprising:

an operation member loosely and rotatably mounted on said rotary shaft;

a friction member contactable with a portion of said rotary shaft and coupled with said operation member;

biasing means for biasing said friction shaft onto said portion of said rotary member to cause a friction; and an engagement member provided on said operation member for operating said reversal preventive claw when said operation member is rotated through said friction in linking with a rotation of said rotary shaft.

2. The reversal preventive device according to claim 1, wherein said engagement member operates said reversal preventive claw to disengage from said rachet wheel when said rotary shaft is rotated in a first direction, and to engage with said rachet wheel when said rotary shaft is rotated in a second direction opposite from said first direction.

3. The reversal preventive device according to claim 1, wherein said operation member is formed into an annular shape circumscribing said rotary shaft.

4. The reversal preventive device according to claim 3, wherein said friction member and said biasing means are accommodated in a radially extending recess formed in said operation member so that said friction member is radially inwardly depressed onto an outer periphery of said rotary shaft by said biasing means.

5. The reversal preventive device according to claim 3, wherein said friction member is integrally provided on said operation member.

6. The reversal preventive device according to claim 5, wherein said biasing means biases said friction member and said operation member in an axial direction of said rotary member.

7. The reversal preventive device according to claim 1, wherein said operation member is formed into an arcuate shape.

8. The reversal preventive device according to claim 7, wherein said friction member is formed into an arcuate shape and pivotably connected to said operation member.

9. The reversal preventive device according to claim 8, wherein said means biasing biases said friction member so that said rotary shaft is clamped between said operation member and said friction member.

10. The reversal preventive device according to claim 1, wherein said biasing means includes a spring kept in non-contact with said rotary member.

* * * * *